UNITED STATES PATENT OFFICE.

CHARLES C. HUFFMAN, OF CHICAGO, ILLINOIS, ASSIGNOR TO SUNBEAM CHEMICAL COMPANY, OF CHICAGO, ILLINOIS, A CORPORATION OF ILLINOIS.

METHOD OF MAKING UNIVERSAL DYES.

1,283,519.  Specification of Letters Patent.  Patented Nov. 5, 1918.

No Drawing.  Application filed April 1, 1918.  Serial No. 225,903.

*To all whom it may concern:*

Be it known that I, CHARLES C. HUFFMAN, a citizen of the United States, and resident of Chicago, in the county of Cook and State of Illinois, have discovered a certain new and useful Method of Making Universal Dyes, of which the following is a specification.

My invention relates to a new and improved method of manufacturing dyes and particularly dyes combined in a saponified substance.

It is well known that certain of the neutral dyes are adapted to be combined in a neutral saponified solution and be released therefrom when the substance is applied to a fabric. The uses to which such material may be put are limited and none of the darker shades may be produced without staining the hands of the user. It has not heretofore been thought possible to employ acid or alkali anilin dyes indiscriminately in a product of this sort as all efforts along that line have resulted in the production of an article which would stain the hands of the user and the utensils employed. I have discovered a process whereby anilin dyes, particularly of the azo group, may be so treated and combined with a soap solution that they may be used freely without fear of staining the hands of the operator. These dyes, when so formed, are universal, that is, they act on and successfully dye silk, cotton, wool and flax; they are alkali proof and fast under all conditions.

The reaction and readjustment of the molecules is complex and has not been definitely ascertained. The result is, however known and the method by which the result is accomplished is hereby explained.

The practice of my invention on a commercial scale is substantially as follows:

A quantity of oil such as olive, soy bean, raisin, peanut, corn, or similar vegetable oil, may be used separately or combined with cocoanut oil. The amount of oil used will, of course, depend on the quantity of the final product desired. For best results, however, the dye should be made in as large quantities as possible. To the oil is added a quantity of sodium or potassium hydroxid or other suitable saponifying agent, the amount being of such strength as to be somewhat in excess of the theoretical amount required for complete saponification of the oil. The solution is then agitated until thoroughly mixed, the reaction raising the temperature somewhat. Before the reaction is complete; that is, before the oil is entirely saponified, the dye in a hot aqueous solution is added. To produce different shades or colors I have employed alkaline colors such as acid red, chrysoidin yellow, methylene blue, direct black, etc., each of which seems to act successfully in the production of the desired article. If more than one color is to be employed the colors are separately dissolved in boiling water and separately added to the partially saponified solution.

The subsequent reaction together with the heat of the dye solution further raises the temperature of the mixture. After further agitation, until the ingredients are thoroughly combined, the substance is poured into a large mold or frame in which it is allowed to remain from thirty-six to forty-eight hours. A peculiar action is discernible. The substance after being poured seems at first to cool somewhat but after standing for a few hours the temperature raises until in the interior of the large mass it reaches as high as 80° C. This continues for a few hours when the temperature again lowers until the reaction is complete and the substance is at normal temperature. After the mass has cooled to normal temperature it is slabbed and pressed into cake form.

Apparently the reaction which was started when the materials were combined continues and is augmented by the heat of the mass until the transformation or molecular reorganization is complete. The dye which was employed and which is especially adapted to stain everything with which it contacts now has no affinity for nor will it adhere to the hands of the user or to the utensil in which the dyeing operation is carried out. Nevertheless, the dye has a strong affinity for all fabrics. It requires no boiling nor mordant for setting. It is alkali proof and fast.

The real test as to the amount of alkali employed as whether after following the process outlined herein there is any staining action on the hands of the user. If there is a staining action it is apparent that insufficient alkali has been added, the staining action being caused by the presence of undissolved and unreformed dye.

It is apparent from the experiments heretofore made that much the same result may be secured if the alkali is added to the dye solution instead of to the oil. This has not up to this time been found to be a practical process the final product being much harder to handle and requiring longer for the completion of the operation.

The proportions of substances and the temperatures employed will now be specified.

Assuming it is desired to form a cake or mass sufficient to produce twenty-six gross of one ounce bars of the article, approximately twenty gallons of one or more of the vegetable oils referred to is placed in a mechanical mixer. To this is added approximately seven gallons and 16 ounces, of 40° Baumé sodium hydroxid, which quantity of lye is increased to the extent of one fluid ounce for each ounce of color employed in producing the desired shade. For instance, if a medium blue is to be produced, thirty ounces avoirdupois of methylene blue is dissolved in approximately thirty pints of boiling water, the mixture being agitated until the dye is completely dissolved. If, as in this case, thirty ounces of the color is employed, the amount of lye will be increased to the extent of thirty fluid ounces. The amount of water necessary will also vary somewhat with the degree of solubility and quantity of the dye. After the lye and oil have been combined and thoroughly mixed and the reaction following the mixing is practically complete, it will be found that the temperature in the mixture with a normal room temperature of 22° C., will be approximately 50° C. At this point the dye solution, which will be approximately 90° to 95° C., will be added, the temperature of the mass being increased slightly thereby. The mixing is continued until such a time as the dye is thoroughly combined in the mass, after which it is poured into a large mold or frame, the temperature at the time of pouring being 50° to 55° C. This temperature remains constant for approximately fifteen minutes whereupon it increases slightly until after standing in the frame for one to two hours the temperature will be found to be as high as 80° C. or slightly thereabove after which there is a very gradual descent of the heat curve for a period of twenty-four hours. After being allowed to remain in the mold for a period of twenty-four to thirty-six hours, the molded cake is removed from the frame, slabbed, cut into cakes and pressed. It has been found that a product made in the manner described gives much better results than any heretofore produced. Apparently this is caused by the fact that the reaction which was started in the mixer is continued in the mass, the heat of the reaction, which is conserved because of the large body of material, aiding in the reaction and making the transformation of the dye more complete.

It will be understood, of course, that the proportions of ingredients will be varied in order to produce different shades and quantities and that the temperatures will vary somewhat in different colors. Also that the invention is not limited to the use of the specific vegetable oils mentioned or to the particular hydroxid designated. Furthermore in the production of different colors, other dyes of the anilin group, either acid or basic, are employed with desirable results.

I claim:

1. The method of making a dye which consists in dissolving a quantity of anilin dye in hot water, then adding the solution to an incompletely saponified soap solution containing free alkali, then thoroughly mixing the mass, then casting the substance in a relatively large block and permitting the reaction and reformation of the dye to continue in the mass until complete.

2. The method of making a universal, non-staining dye which consists in combining an oil, a saponifying agent and an anilin dye, thoroughly mixing the same, then molding the mass in a large block and permitting the reaction to continue for a period exceeding twenty-four hours during which time the temperature of the mass, due to the chemical reaction, is raised and lowered approximately 30° C.

3. A method of producing a dye in a chemical combination with a soap, which consists in combining a vegetable oil, and a quantity of a saponifying agent, permitting the reaction therein to continue until partially completed, then adding a quantity of a dissolved anilin dye, then agitating the mass, then molding the mass into a large cake at a temperature of approximately 50° C., then permitting the reaction to continue in the mass until completed, the temperature of the mass, due to the reaction, raising substantially 30° during the first two hours after being poured, then gradually lowering to room temperature, then slabbing the cake.

4. The method of producing a dye soap which consists in combining suitable quantities of vegetable oil, a saponifying agent and dye, thoroughly agitating the mass, then molding the same in a relatively large block and permitting the reaction to continue in the mass for at least twenty-four hours, the quantity of reagent employed being sufficient to cause the temperature of the mass to be materially raised shortly after being molded, then to gradually decrease to room temperature, substantially as described.

Signed at Chicago, Ill., this 29th day of March, 1918.

CHARLES C. HUFFMAN.

Witness:
T. D. BUTLER.

Copies of this patent may be obtained for five cents each, by addressing the "Commissioner of Patents, Washington, D. C."